Patented May 5, 1942

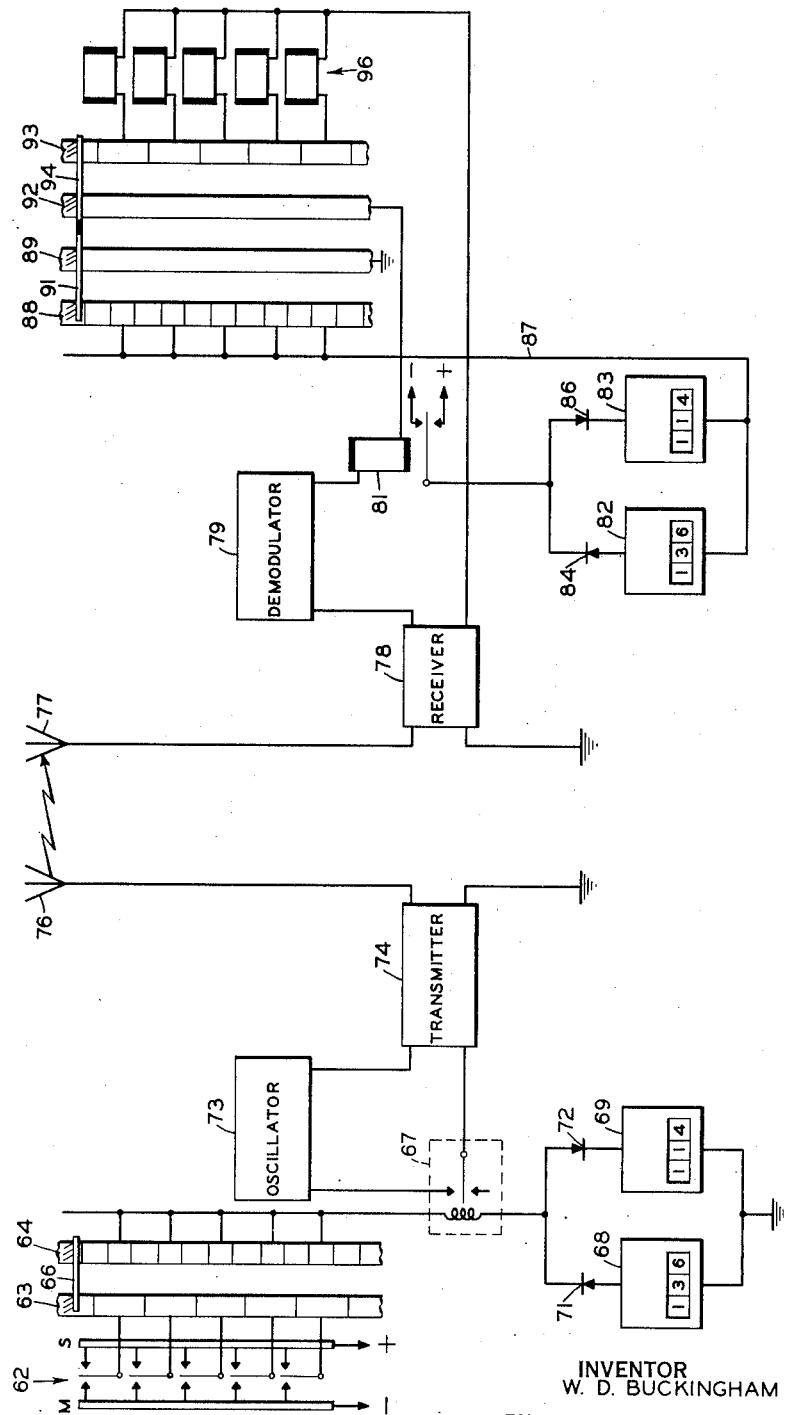

2,281,745

UNITED STATES PATENT OFFICE 2,281,745

PRINTING TELEGRAPH ERROR DETECTING SYSTEM

William D. Buckingham, Southampton, N. Y., assignor to The Western Union Telegraph Company, New York, N. Y., a corporation of New York Application May 19, 1939, Serial No. 274,535

8 Claims. (Cl. 178—69)

This invention relates to printing telegraph systems and has particular reference to a method of and means for detecting errors in the received messages.

The numerous systems and apparatus which have previously been devised for detecting errors occurring in the transmission of messages transmitted by printing telegraph systems have either employed intricate and costly terminal apparatus or have been wasteful of line time.

Hence, it is an object of this invention to provide means for detecting errors in received messages which are extremely simple and inexpensive.

Another object of the invention is to provide a means for and a method of detecting errors which utilize only a small percentage of the channel time.

Still another object of the instant invention is to provide means for detecting errored messages in which a high degree of accuracy is inherent.

A further object of the invention is to provide means for detecting errors in received messages which are readily adaptable to the present printing telegraph apparatus.

The present invention may be used in conjunction with any printing telegraph apparatus operable by means of permutation codes which comprise a plurality of components, each of which may represent any one of a plurality of electrical conditions. Well known systems of this character are the so called Baudot five-unit code, utilizing selecting and non-selecting conditions, and a code used extensively in cable operations in which three elements, usually plus, minus and ground, are combined in various combinations to represent characters. This invention provides for the segregation and registering of one or more of said conditions at both the transmitting and receiving stations. At the finish of the transmission of a message, the totals of said segregated impulses or conditions are noted by the sending operator and a character representative of the totals is transmitted and received by the receiving equipment where it may be checked against a like record at this station. A discrepancy is indicative of the occurrence of an error in the message previously transmitted.

Illustrative embodiments of the invention and the modes of operation thereof will be described in conjunction with the accompanying drawings, of which—

Fig. 2 illustrates diagrammatically another embodiment of the invention as used in a synchronous multiple telegraph system.

Figure 1:
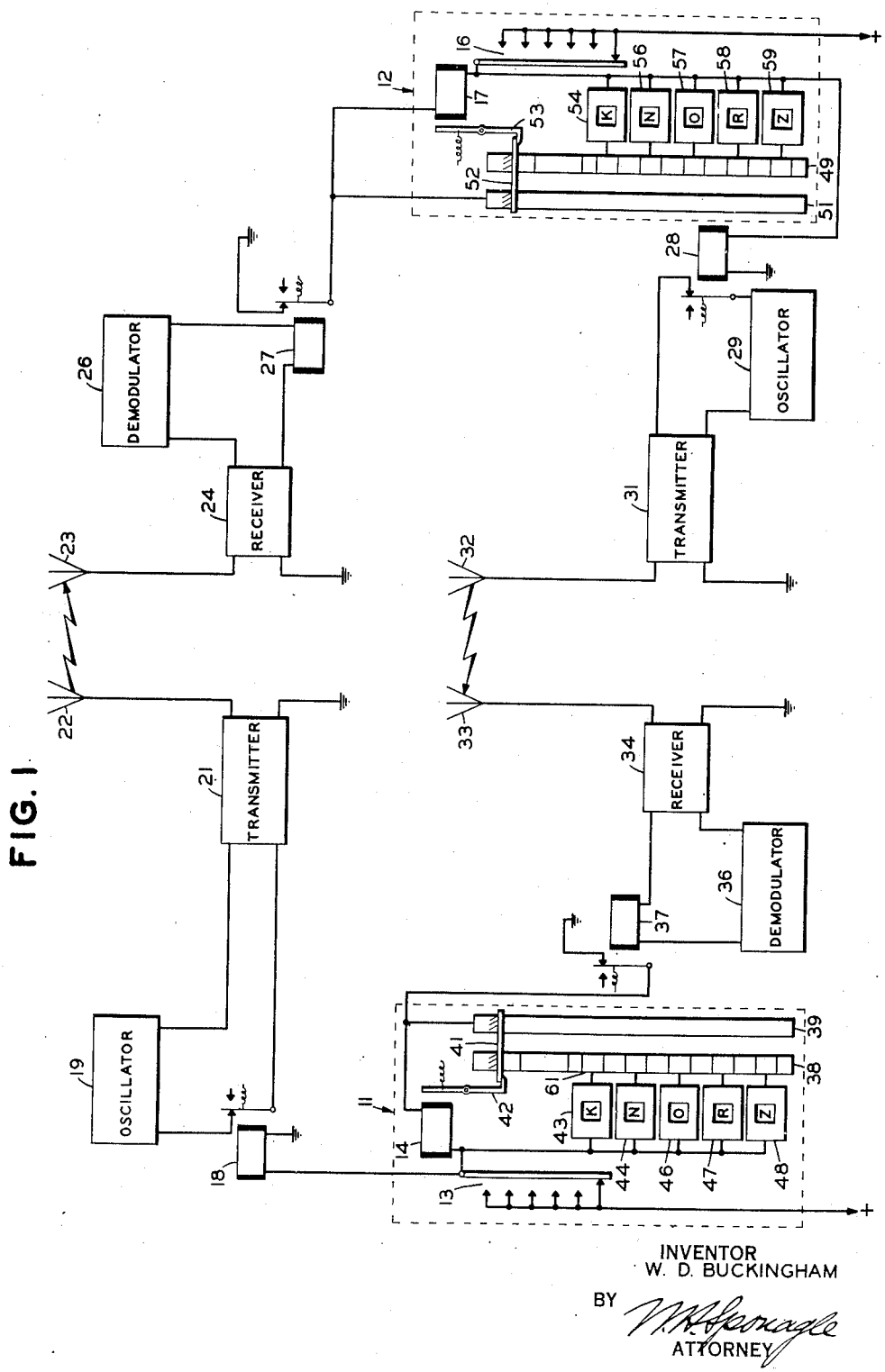
Fig. 1 is a diagrammatic representation of the invention embodied in a start-stop telegraph system, employing a radio frequency carrier channel.

Having reference first to Fig. 1, there is shown printing telegraph apparatus 11 and 12 interconnected by means of radio channels whereby communication between the two stations is afforded. The printing telegraph apparatus 11 is equipped with a transmitting element 13 and a selecting magnet 14. Similarly, the telegraph apparatus 12 is provided with a transmitting element 16 and a selecting magnet 17. The operation of the transmitting mechanism 13 of printer 11 causes a transmitting relay 18 to key an oscillator 19 whereby code signals are impressed by a transmitter 21 upon an antenna or radiator 22. The energy radiated from the antenna 22 is collected by means of an antenna 23 and passed to a receiver 24. The alternating current signals are rectified by means of a demodulator 26 and are then employed to operate a receiving relay 27. The selecting magnet 17 of printer 12 responds to the output of the receiving relay 27 to actuate the selector mechanism of the printer causing a character to be recorded.

The operation of the transmitting mechanism 16 of printer 12 effects the operation of a transmitting relay 28 whereby an oscillator 29 is keyed to actuate transmitting apparatus 31. The radio frequency signals emanating from the transmitter 31 are impressed upon a radiator 32 and collected by an antenna 33. The signals thus received are impressed upon a receiving device 34 and are rectified by means of a demodulator 36 for the purpose of operating a receiving relay 37. The output of this relay is applied to the selecting magnet 14 of printer 11, which controls the selector mechanism of this printer.

The telegraph printer 11 is provided with a sequencing device, which may be attached to the receiving cam shaft and may be in the form of a series of cam contacts or, as illustrated in the drawings, in the form of a segmented ring 38 and a solid ring 39, both of which are traversed by a brush 41. With the printer in its idle condition, the brush 41 is held in its stop position by means of a latch 42 which is controlled from the selecting magnet 14. Connected individually to the spaced segments of ring 38 are five registers or counters 43, 44, 46, 47 and 48. The other terminals of the registers are connected in multiple to the common connection of the selector magnet and the transmitter 13.

The telegraph printer 12 is also provided with a segmented ring 49 and a solid ring 51, both of which are traversed by a brush 52. A latch 53 under the control of the selecting magnet 17 is arranged to hold the brush 52 in its stop position during idle periods and to release the brush in response to a start signal applied to the selecting magnet. Five registers or counters 54, 56, 57, 58 and 59 are connected individually to the segments of ring 49 and also to the transmitter 16 and the selecting magnet 17.

In the printer 11 the selector magnet 14 is responsive to the operation of the transmitter 13, thereby recording the character transmitted from this printer. As previously described, the transmitting relay 18 is also responsive to transmission from printer 11 whereby the signals are transmitted over the communication channel and received by the selector magnet 17 of printer 12 causing the character to be recorded on this printer. In response to the start signal sent by transmitter 13, which is an open circuit condition, the selecting magnet 14 is deenergized thereby permitting the latch 42 to be withdrawn and the brush 41 released for rotation. The brush is orientated with respect to the segments of ring 38 so that its traversal of the successive segments coincides with the transmission of corresponding signal components from the transmitter 13. Thus, if the first impulse to be transmitted is a marking pulse, the contact will be closed from the battery connected to the transmitter 13 through one of its cam contacts, the winding of selecting magnet 14 to ground connected to the front contact of relay 37. Connected in multiple with the selecting magnet 14 is the register 43, segment 61, brush 41 and solid ring 39. Hence the marking impulse which is employed to actuate the transmitting relay 18 and the selecting magnet 14 is also instrumental in actuating the register 43. In a similar manner the registers 44, 46, 47 and 48 are arranged to record all marking impulses sent from the transmitter 13 and corresponding to a particular one of the signal components.

The operation of receiving relay 27 in response to signals sent from the printer 11, in addition to operating the selecting magnet 17 of the printer 12, actuates the registers 54, 56, 57, 58 and 59 in accordance with the marking impulses received.

It is thus seen that at the termination of the transmission of a message from the printer 11 there is a record on the registers of all of the marking impulses transmitted. Furthermore, these marking impulses are segregated according to the signal components in which they occurred. If the signals have been correctly received by the telegraph instrument 12 there will be an identical record on the registers associated with this apparatus. Subsequent to the message transmission the transmitting operator refers to the registers associated with the instrument 11 and transmits a series of five characters corresponding to the designations which appear on the registers. These five characters, when received by the operator attending the instrument 12, are compared with the record appearing on the registers associated with this apparatus at the end of the message transmission.

The registers employed in a system of this nature may be any conventional type of counters in which the recording is in the form of figures. In this case only the last or units digits of the total indicated on the five registers need be transmitted as a five figure combination for confirmation purposes. Any gain or loss of marking or selecting impulses during transmission will be evidenced by a difference in the totals registered at the transmitting and receiving ends of the circuit. The system hereinabove described is accurate except in the very remote case of gains being exactly offset by losses of the same impulse, or in case the gain or loss of marking impulses for any particular component of the code combinations is equal to ten or some multiple thereof.

The registers employed for counting the selecting impulses may be arranged as shown to give indications in letters instead of figures. By such means the latter possibility of an erroneous indication of the marking signals transmitted is rendered even more remote. In this case the gains or losses of impulses will have to be equal to twenty-six or an exact multiple thereof in order for an incorrect indication to be given.

At the receiving end of the circuit the registers or counters employed may be in the form of typewheels attached to the telegraph instrument in any well known manner and arranged to record the totals registered thereon at the finish of the transmission of a message in response to a special signal sent over the circuit. Such means are well known in the art and will not be described further. Thus after the special signal which records the totals registered at the receiving station, the totals which are transmitted over the circuit from the transmitting station are imprinted adjacent thereto for the purpose of comparison.

In Fig. 2 there is disclosed a modification of the invention embodied in a synchronous multiplex system. The totalizing apparatus is shown for only one channel of the multiplex system, it being understood that similar apparatus may be connected to the other channels in a manner similar to that shown. A tape transmitter 62 is connected to the individual segments of a ring 63, which is associated with a second segmented ring 64, both of which are traversed by a brush 66. The spaced segments of ring 64 are connected in multiple to one terminal of the winding of a polarized relay 67. The other terminal of this relay winding is connected to a pair of registers or counters 68 and 69. The other terminals of the counters are connected to ground, thereby completing a circuit from the battery supplied to the bus bars of the transmitter 62. In series with the connections between the relay 67 and the counters 68 and 69 are unidirectional conducting devices such as copper oxide rectifiers 71 and 72 or the like. These rectifiers are poled so that when positive potential is applied to the relay 67, the counter 69 is actuated and when negative is applied to the relay, counter 68 is actuated. The contacts of relay 67 are arranged to key an oscillator 73 and thereby impress trains of oscillations corresponding to marking impulses upon a transmitter 74 from which they are transmitted from a radiator 76.

The signals emanating from the radiator 76 are collected on a receiving antenna 77 from which they are transferred to a receiving device 78. The signals thus received are rectified by means of a demodulator 79 and are employed to operate a receiving relay 81. The contacts of this relay are arranged to impress positive or negative potential upon the parallel connection of registers 82 and 83. Rectifiers 84 and 86 are included in the circuits between the contacts of relay 81 and the registers 82 and 83, and are so poled that counter 83 responds to positive impulses and counter 82 responds to negative impulses. The circuit is further extended from the counters 82 and 83 by means of conductors 87 to the spaced segments of ring 88. Associated with this ring is a solid ring 89 to which is connected a ground so that, as the rings are traversed by a brush 91, a circuit is periodically closed between one of the contacts of relay 81, through one of the counters 82 and 83 and through one of the segments of ring 88 to the ground connected to ring 89.

Included in the circuit employed to operate relay 81 is a solid ring 92 and a segmental ring 93. A brush 94 is arranged to thereby sequentially complete circuits through the selecting magnets ground connected to ring 89.

The operation of the system described above should be so readily understood that only a brief description thereof will be given. The tongues of the transmitter 62 are set against the bus bars of the transmitter in combinations corresponding to the perforations in the tape. As the brush 66 travels over the rings 63 and 64, potentials having polarities dependent upon the settings of the tongues of transmitter 62 are transferred to the winding of relay 67. The connections of this relay are such that, in response to a marking or selecting impulse sent from the transmitter 62, the contacts are closed and, in response to a spacing or non-selecting signal, the contacts are opened. Thus, for each marking impulse a train of oscillations is transmitted from the radiator 76. Also, by virtue of the connections of rectifiers 71 and 72, all marking or selecting impulses are segregated and recorded on register 68 and all spacing or non-selecting impulses are segregated and recorded on register 69, it being assumed that marking and spacing signals are represented respectively by negative and positive potentials.

After being received, the alternating current signals are rectified and applied successively to the selecting magnets 96 by means of rings 92 and 93 in cooperation with the brush 94. At the same time, relay 81 is responsive to all received signals so that its tongue is positioned on its associated contacts in accordance with the selecting or non-selecting character of the received signals. Thus the received signals are segregated and counted in a manner similar to that of the transmitted signals, the marking or selecting signals being registered by counter 82 and the spacing or non-selecting signals being recorded by counter 83.

At the end of the transmission of a message, the sending operator may refer to the counters 68 and 69 and send over the communication channel a number representative of the difference between the indications of the respective counters. The number thus transmitted is compared at the receiving station with a corresponding number registered by the counters 82 and 83. Non-conformity between these two figures indicates an error in the transmission of the message. The counters 68 and 69 may be combined into one unit whereby the difference is automatically registered. One such device of this nature would operate so that the register mechanism is stepped in one direction in response to a selecting impulse and is stepped in the reverse direction in response to a non-selecting impulse. The registers 82 and 83 at the receiving station may also be in this form, and in addition may be arranged in the form of typewheels attached to the printing mechanism of the receiving instrument so that the number registered may be recorded in response to a special signal sent over the channel.

In transmitting a message from the point of its origin to its final destination several relays of the message may be made. The transmission circuit may comprise different media, such as land lines, submarine cables, radio channels and the like. In traversing the various links of a complete circuit different signaling codes may be used. Hence, it is contemplated that the utilization of either one or any desired combination of both of the disclosed embodiments of the invention, or any other modification thereof which will occur to those skilled in the art, with such a communication system be considered as being within the scope of this invention. The only requirement is that, in the final reception of the message, the same signaling code and the same system of error detection be employed as that employed in the initial transmission of the message. In this manner, means are afforded for detecting all errors, both operator and equipment, subsequent to the original transmission of the message.

The invention has been described in conjunction with two embodiments thereof. The nature and more of operation of the invention may thus be determined from the foregoing specification. The scope of the invention is set forth in the appended claims.

What is claimed is:

1. In a printing telegraph system utilizing signals each comprising a plurality of components having one of a plurality of electrical conditions according to a predetermined code, transmitting and receiving instruments, means associated with said transmitting instrument for segregating all of one of said conditions transmitted, means for integrating said segregated transmitted conditions according to a prearranged plan, means associated with said receiving instrument for segregating all of said one condition received, means for integrating said segregated received conditions according to said plan, and means for comparing the results of said integrations.

2. In a printing telegraph system, transmitting and receiving instruments, and apparatus for detecting a discrepancy between the transmission and reception over a communication channel of intelligence signals each comprising a plurality of components representing selecting and non-selecting conditions, comprising means associated with said transmitting instrument for segregating and totaling according to a prearranged plan all of the selecting conditions transmitted, means associated with said receiving instrument for segregating and totaling according to a prearranged plan all of the selecting conditions received, and means for comparing said transmitted and received totals.

3. A printing telegraph system, comprising a transmitter for sending code combinations of selecting and non-selecting conditions, a receiver for translating and recording said code combinations, means associated with said transmitter for obtaining the difference between the total number of said selecting and non-selecting conditions transmitted during a period of time, means associated with said receiver for obtaining the difference between the total number of said selecting and non-selecting conditions received during said period of time, and means for comparing said transmitted and received differences.

4. A printing telegraph system, comprising a transmitter for sending code combinations each consisting of variable numbers of selecting and non-selecting conditions, a receiver for translating and recording said code combinations, means associated with said transmitter for counting the total number of selecting conditions transmitted during a period of time, means associated with said transmitter for counting the total number of non-selecting conditions transmitted during said period, means associated with said receiver for counting the total number of selecting conditions received during said period, means associated with said receiver for counting the total number of non-selecting conditions received during said period, and means for comparing the transmitted preponderance of one of said conditions over the other with the received preponderance of said one condition over said other condition.

5. In a printing telegraph system utilizing signals each comprising a plurality of components having one of a plurality of electrical conditions, the number of signal components having like electrical conditions varying according to a predetermined code, transmitting and receiving instruments, means associated with said transmitting instrument for segregating and integrating according to the respective components all of one of said conditions transmitted, means associated with said receiving instrument for segregating and integrating according to the respective components all of said one condition received, and means for comparing the results of said integrations.

6. In a printing telegraph system utilizing signals each comprising a plurality of components representing variable numbers of selecting and non-selecting conditions according to a predetermined code, transmitting and receiving instruments, means associated with said transmitting instrument for segregating and integrating according to the respective components all of said selecting conditions transmitted, means associated with said receiving instrument for segregating and integrating according to the respective components all of said selecting conditions received, and means for comparing the results of said integrations.

7. In a printing telegraph system, the method of detecting a discrepancy between the transmission and reception over a communication channel of intelligence signals each comprising a plurality of components having one of a plurality of electrical conditions, the number of said components having like electrical conditions varying according to a predetermined code, which consists in making a record in response to the transmission and a record in response to the reception of all of one of said electrical conditions segregated according to individual components, transmitting a character for each of said components, said characters corresponding to the transmission record, and comparing said transmitted characters with said reception record.

8. In a printing telegraph system, the method of detecting a discrepancy between the transmission and reception over a communication channel of intelligence signals each comprising a plurality of components representing variable numbers of selecting and non-selecting conditions according to a prearranged code, which consists in making a record in response to the transmission and a record in response to the reception of all of said selecting conditions segregated according to individual components, transmitting a character for each of said components, said characters corresponding to the transmission record, and comparing said transmitted characters with said reception record.

WILLIAM D. BUCKINGHAM.